United States Patent [19]

Arroyo et al.

[11] Patent Number: 5,745,627
[45] Date of Patent: *Apr. 28, 1998

[54] COMPOSITE CABLE FOR FIBER-TO-THE-CURB ARCHITECTURE USING CENTRALIZED POWER

[75] Inventors: Candido John Arroyo, Lithonia; Richard Lee Knight, Cumming, both of Ga.

[73] Assignee: Lucent Technologies Inc., Murry Hill, N.J.

[*] Notice: The term of this patent shall not extend beyond the expiration date of Pat. No. 5,481,635.

[21] Appl. No.: 583,145

[22] Filed: Dec. 28, 1995

[51] Int. Cl.⁶ .................................................. G02B 6/44
[52] U.S. Cl. .................... 385/101; 174/70 A; 174/121 A
[58] Field of Search ........................ 174/70 A, 121 A; 385/100, 101, 102, 103

[56] References Cited

U.S. PATENT DOCUMENTS

| | | | |
|---|---|---|---|
| 4,158,478 | 6/1979 | D'Auria et al. | 385/101 |
| 4,695,127 | 9/1987 | Ohlhaber et al. | 385/101 |
| 4,852,965 | 8/1989 | Mullin et al. | 385/101 |
| 5,042,904 | 8/1991 | Story et al. | 385/105 |
| 5,189,718 | 2/1993 | Barrett et al. | 385/101 |
| 5,268,971 | 12/1993 | Nilsson et al. | 385/101 |
| 5,293,678 | 3/1994 | Chamberlain et al. | 29/401.1 |
| 5,481,635 | 1/1996 | Arroyo et al. | 385/103 |

Primary Examiner—Hyung S. Sough

[57] ABSTRACT

A composite distribution cable for connection to a customer's premises has a fiber optic cable, twisted voice band pairs, copper power cables, and a coaxial cable within a common sheath. Water blocking members within the cable fill the voids between the conducting members and the sheath upon contact with water or other liquid.

5 Claims, 2 Drawing Sheets

5,745,627

COMPOSITE CABLE FOR FIBER-TO-THE-CURB ARCHITECTURE USING CENTRALIZED POWER

FIELD OF THE INVENTION

This invention relates to a communications cable and, more particularly, to a composite distribution cable for broad band signals, narrow band signals, and power distribution including a fiber optic cable, twisted voice band pairs, copper power lines, and a coaxial cable within a common sheath.

BACKGROUND OF THE INVENTION

Fiber optic cables, coaxial cables, and twisted voice band pairs are widely used in the telecommunications industry. High pair count copper cables, containing individual twisted pairs of conductors, are frequently used as feeder cables between telephone customers and the telephone company's central office. Broad band coaxial cables are often found in cable television (CATV) systems. Fiber optic cables have been more recently used and are revolutionizing the long distance telecommunications industry in the United States and in many other countries. Fiber optic cables are also penetrating into local telephone markets and CATV markets, displacing the older technologies. Fiber optic cables offer numerous advantages over prior technology. For example, a fiber optic cable may provide a distance of 50 miles or more with currently available electronics. Fiber optic cables may transport digital light pulses for essentially noise-free communications and transmissions of vast quantities of information. The fibers, when used to transmit information in a digital signal form, offer wide signal band widths which can replace both coaxial cables currently used for broad band signals and copper pair cables currently used for narrow band voice signals. Fiber optic cables are thus slowly taking the place of conventional cables due to their high bit rate capacity, small size and light weight.

Although service has not completely evolved from twisted voice band pair and coaxial cable to fiber optic cables the demand is growing. For this reason, telephone companies have expressed the desire to install cables which include optical fibers as well as metallic conductors. Such a course of action of early placement of optical fibers in aerial or buried installations to customers' premises will facilitate the later transition from a metallic to an optical fiber operating system. Obviously, the final cost of installing optical fiber to customers' premises is minimized by such an approach. With such a composite cable, optical fiber can be provided to customers' premises awaiting the arrival of the optical fiber network and development of associated hardware and electronics.

One possible approach to providing for future growth of optical fiber cable routes is suggested by the prior art wherein hybrid coaxial and fiber optic cables are disclosed. For example, U.S. Pat. No. 4,695,127 to Ohlhaber et al. discloses a hybrid cable wherein an optical fiber is positioned in a channel located between the center conductor of a coaxial cable and the outer conductor during the manufacture of the cable. Another approach is illustrated by U.S. Pat. No. 5,293,678 to Chamberlain et al. wherein a coaxial cable is provided that contains an empty longitudinal channel so that the cable can be readily upgraded by installing a fiber optic cable within the channel.

In the cables above described various signal bearing wires are combined within a single cable. However, none of the cables combine an optical fiber cable with twisted voice band pairs, copper power cables, and coaxial cable all within a common sheath. Thus, none of the prior art cables make possible the gradual evolution from coaxial cable and twisted voice band pair to broad band fiber as the demands for broad band optical fiber services grow at variable rates throughout the country.

The ideal composite cable that allows the gradual evolution from coaxial cable and twisted voice band pairs to broad band fiber includes one or more optical fiber cables, the twisted voice band pairs, a broad band coaxial cable, and copper power cables within one sheath. Such a cable makes possible the gradual transition to use of the optical fiber technology and provides for enhanced coaxial and voice band service in the meantime. For example, the cable provides test means extending back to the central offices for testing continuity throughout the system. The cable also makes it possible for the end customer to communicate with the central office in order to request particular programming of, for example, a particular video signal such as pay TV or various types of subscriber add-ons ancillary to the broad band signal capability.

SUMMARY OF THE INVENTION

The present invention is directed to, and represents, a solution to the various problems and deficiencies of prior art cable systems as discussed in the foregoing.

In a preferred embodiment, the invention comprises a composite cable structure including one or more fiber optic cables, twisted voice band pairs, copper power cables, and a coaxial cable within a common sheath. The twisted voice band pairs and copper power cables are shielded one from the other to prevent interference. The fiber cable is protected from undue stress that can be imparted to such communication cables. The cable is specifically designed for use in fiber-to-the-curb (FTTC) applications but can be used anywhere in the system.

The basic structure of the cable of the invention includes a coaxial core member comprising a central conductor and a tubular metallic member or outer conductor. In between the two conductors is a dielectric material and the two conductors and dielectric material comprise the coaxial cable. The core member is surrounded by an insulating jacket. In one preferred embodiment, externally of the outer conductor, but located internally of the insulating jacket, preferably in contact therewith, is a pair of, for example, 10 gauge shielded power cables which extend longitudinally and substantially parallel to the central conductor of the coaxial cable. Also contained within the jacket but externally of the metallic member is a twisted pair of insulated voice communication wires of, for example, 22 gauge copper wire, which also extend longitudinally and substantially parallel with the core member In order to avoid any possible interference or cross-talk within the power cable, the twisted pairs are preferably located diametrically opposite the power cables, i.e., on the opposite side of the cable axis or the central conductor. One or more fiber optic cables, each comprising a pair of optical fibers encased within a protective plastic sheath are located as well within the jacket but externally of the metallic member The fiber optic cables are preferably located adjacent to or near either the twisted voice band pair or the pair of power cables.

The inclusion of the power cables, twisted pairs, and optical fibers within the jacket but exterior to the metallic member encasing the central conductor necessarily creates voids through which water may flow, wreaking havoc on the proper functioning of the cable. To this end, the empty spaces or voids contain filamentary water-blocking material, preferably in the form of strands of yarn impregnated with a super-absorbent material. Such a water blocking yarn thus treated has the property, when exposed to water or other moisture, of swelling to several times its original size without being dissolved in water, and thereby blocking any water passages created by the voids.

A second preferred embodiment of the invention includes a second metallic sheath external of the power cables, voice band cables, and fiber optic cable but internal of the jacket. Another preferred embodiment includes a single metallic sheath external of the power cables, voice band cables, and fiber optic cable and internal of the jacket and does not include a metallic sheath directly next to the dielectric material.

The cable of the invention may be used in virtually any portion of the system between the signal receiving station, such as a satellite dish antennae, and the customer premises. However, the cable is particularly designed for portions of the system where fiber optic capability is slowly replacing use of coaxial and narrow band voice communications wires such as in FTTC applications.

The cable assures adequate power transmission in the amplifiers and other power consuming components of the system and, in addition, insures that adequate voice or other narrow band communication exists between the customer premises and the central office. Inclusion of the twisted pair as voice and test leads makes it possible to test for any breaks or discontinuities in the cable as opposed to separate twisted pairs external to the cable. Inclusion of the fiber optic cables allows for eventual switching over to the more powerful optical fiber technology as demand grows for optical fiber and the services it allows.

The numerous features and advantages of the present invention will be readily apparent from the following detailed description read in conjunction with the accompanying drawings.

DETAILED DESCRIPTION

Figure 1:
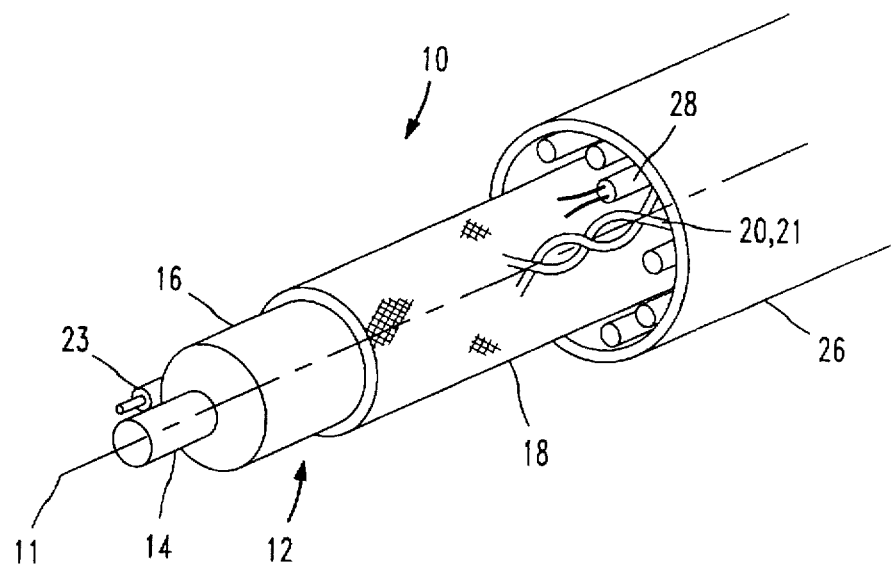
FIG. 1 is a perspective partially cutaway view of a preferred embodiment of the composite cable of the invention.

In FIG. 1 there is shown in perspective a composite cable 10 of the present invention. Cable 10, having a longitudinal axis 11, includes a coaxial cable for carrying broad band signals that has a core member 12 consisting of a central conductor 14 surrounded by and encased in a cylindrical dielectric member 16 of suitable material, such as polyester foam. Dielectric member 16 is in turn encased in a metallic sleeve or outer conductor 18 which preferably is a metallic mesh material. A twisted pair of insulated wires 20, 21 is positioned adjacent the surface of the outer conductor 18 and extends along the length of the cable preferably parallel to the axis 11 thereof. On the opposite side of the axis, diametrically opposite the twisted pair, is a pair of insulated, preferably shielded, cables or wires 23, 24 (only one of the pair is visible in FIG. 1). Wires 23 and 24 are positioned diametrically opposite the twisted pair 20, 21 to minimize electromagnetic interference by the power wires on the twisted pair. Wires 23 and 24 extend longitudinally along the surface of the outer conductor 18, preferably in contact therewith and parallel to the axis 11 of the cable 10. Surrounding the assembly of the core member 12, the twisted pair 20, 21, and the power cables 23, 24 is a jacket 26 of suitable insulating material, such as, for example, polyethylene.

A single fiber optic cable 28, containing two optical fibers, is shown positioned between the outer conductor 18 and the insulating jacket 26 and extends along the length of cable 10 preferably parallel to the axis 11 thereof. Fiber optic cable 28 is located near either the twisted pair 20, 21 or the power cables 23, 24. That is, fiber optic cable 28 is preferably not at a right angle to a plane defined between the twisted pair and the power cables so that if the cable is bent along this plane the fiber optic cable will not be subjected to direct bending. Fiber optic cable 28 comprises a pair of optical fibers 30, 31 encased in an insulating jacket 32 comprised of, preferably, polyethylene. While only one fiber optic cable 28 is shown in the figures it should be understood that one or more fiber optic cables can be contained within the composite cable of the present invention.

Figure 2:
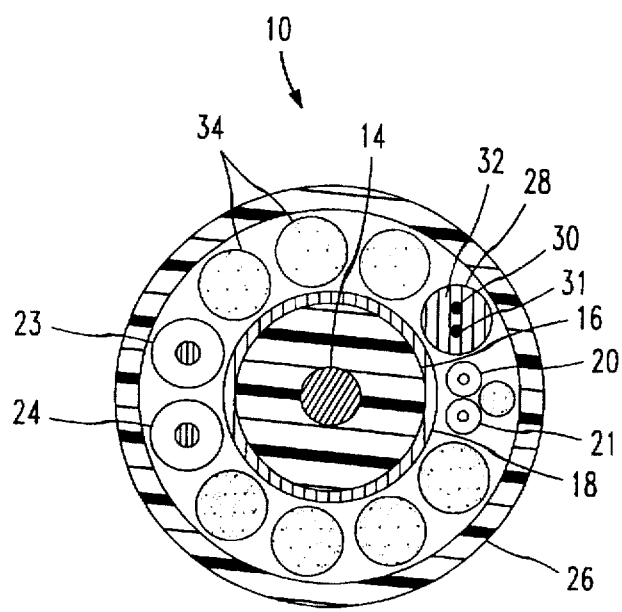
FIG. 2 is a cross-sectional view of the composite cable of FIG. 1.

As can best be seen in FIG. 2, the inclusion of power wires 23, 24, twisted pair 20, 21 and optic fiber cable 28 within the surrounding jacket 26 creates a considerable gap between the outer conductor 18 and the interior surface of jacket 26. This gap has the effect of creating a void for the ingress of water into cable 10, and flow along the length thereof, which can wreak havoc on the proper functioning of cable 10.

In order to block the movement of water into and along the cable 10, water absorbent means such as yarn members 34 are arrayed within the otherwise open space between the outer conductor 18 and jacket 26. The yarn members are preferably made of a water swellable fiber material such as disclosed in U.S. Pat. No. 4,913,517 of Arroyo et al., which is incorporated by reference herein. The members 34 will, when encountered by water, swell and fill the empty spaces to block the passage of water within the cable 10.

Figure 3:
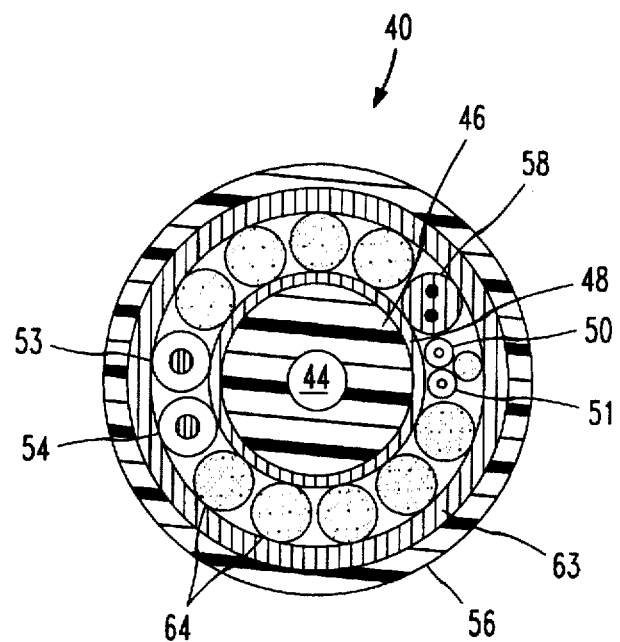
FIG. 3 is a cross-sectional view of a second preferred embodiment of the composite cable of the invention.

In FIG. 3 there is shown a second embodiment of the inventive cable 40 wherein the coaxial core member includes a central conductor 44 encased in a dielectric member 46 of suitable insulating material, such as polyester foam. Outer conductor 48 encases the dielectric member 46. A twisted pair of insulated conductors 50, 51 ties along the exterior surface of the outer conductor 48 and extends along the length of the cable, preferably parallel to the axis thereof as described for the embodiment of FIGS. 1 and 2. Diametrically opposite pair 50, 51 and lying preferably in contact with the outer conductor 48 is a pair of insulated, preferably shielded, power conducting wires 53, 54 which also extend along the length of the cable, preferably parallel to the axis thereof. A fiber optic cable 58 is preferably next to either the twisted pair of wires 50, 51 or the pair of insulating power cables 53, 54. A second metallic shield 63 surrounds the twisted pair of conductors 50, 51, the pair of insulating power cables 53, 54 and the fiber optic cable 58. Surrounding the second metallic shield 63 is an insulating jacket 56 made of, preferably, polyethylene. The space between the outer conductor of the core member and the inner surface of the metallic sheath 63 contains a plurality of water blocking yarn members 64 equivalent to those described in connection with the embodiment shown in FIGS. 1 and 2.

Figure 4:
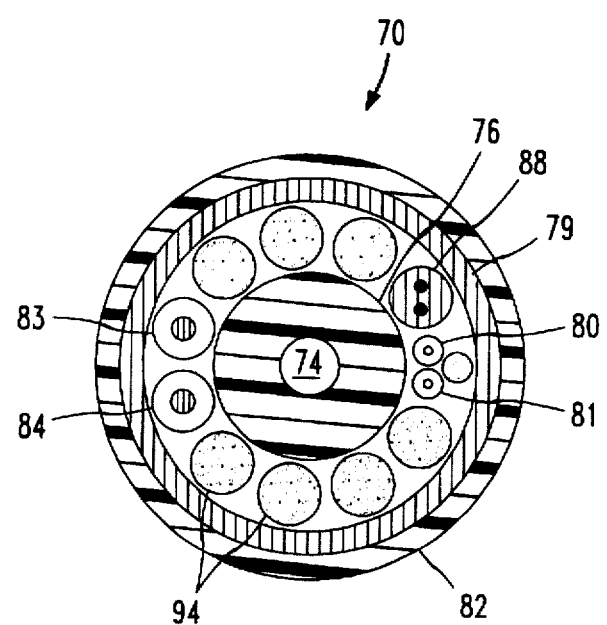
FIG. 4 is a cross-sectional view of a third preferred embodiment of the composite cable of the invention.

FIG. 4 depicts a third embodiment of the invention wherein the cable 70 comprises a coaxial core member that includes a central conductor 74 surrounded by a dielectric material 76. A metallic shield 79 surrounds the dielectric material at a distance therefrom. Between the dielectric material and the metallic shield 79 lie a twisted pair of conductors 80, 81, a pair of insulated power cables 83, 84 and a fiber optic cable 88, all of which are oriented as described in the embodiments shown in FIGS. 2 and 3 above. Also within this space are yarn members 94. A suitable insulating jacket 82 overlies the metallic shield member 79. In this embodiment the metallic shield 79 serves as the second conductor of the coaxial cable with the central conductor 74 and the dielectric material 76 completing the coaxial.

The cable of the present invention has been described as used in one particular type of situation. The combined broad band, narrow band, power capabilities and fiber optic can be potentially used on a wide variety of systems and in a variety of situations, and will function to reduce material installation costs, as well as the cost and unreliability of separate means for handling the differing signals and power requirements in any such systems. While it is known in the prior art to combine various signal bearing wires within a single cable, as shown in a copending U.S. patent application, Ser. No. 08/330,499 to Arroyo, the present invention combines groups of conductors having totally different capabilities in a new and useful structure.

The foregoing discussion has been for the purpose of illustrating the principles and features of the present invention as embodied in a compact, economical composite distribution cable. Numerous changes or variations may occur to workers in the art without departure from the spirit and scope of the invention as set forth in the following claims.

We claim:

1. A composite communication cable having a longitudinal axis, comprising:

a longitudinally extending core member comprising a metallic conductor member encased within a dielectric member;

a second conductor member surrounding said core member and forming a coaxial cable along with said core member for transmitting broad band signals;

a jacket of insulating material surrounding said core member and second conductor member, said jacket being spaced from said core member;

first and second insulated electrical power conducting members disposed substantially adjacent each other and extending along one side of said cable axis spaced therefrom and between said core member and said jacket;

a twisted pair of individually insulated narrow band signal conductors disposed between said core member and said jacket on the oposite side of the cable axis from said power conducting members and extending longitudinally along said cable axis; and a fiber optic cable extending longitudinally along said cable axis and between said core member and said jacket.

2. A composite cable as claimed in claim 1 and further comprising means for preventing the flow of water into and through at least a portion of the space between said core member and said jacket.

3. A composite cable as claimed in claim 2, wherein said water flow prevention means comprises one or more discrete super-absorbent members located in the space between said core member and said jacket and extending along the length of said cable.

4. A composite cable as claimed in claim 1, wherein said second conductor comprises a metallic sheath surrounding said dielectric member in contact therewith and wherein said electrical power conducting members, twisted pair, and fiber optic cable are situated in the space between said metallic sheath and said jacket.

5. A composite cable as claimed in claim 1 further comprising a third conductor member comprising a metallic shield surrounding said second conductor member and spaced therefrom so as to create a space within which the electrical power conducting members, twisted pair, and fiber optic cable are situated.

* * * * *